United States Patent
Liu et al.

(10) Patent No.: US 11,057,384 B2
(45) Date of Patent: Jul. 6, 2021

(54) WEBPAGE UPDATING METHOD AND SYSTEM AND WEBPAGE SERVER

(71) Applicant: ZTE CORPORATION, Guangdong (CN)

(72) Inventors: Zhijun Liu, Guangdong (CN); Ning Chen, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 125 days.

(21) Appl. No.: 15/561,668

(22) PCT Filed: Sep. 28, 2015

(86) PCT No.: PCT/CN2015/090962
§ 371 (c)(1),
(2) Date: Sep. 26, 2017

(87) PCT Pub. No.: WO2016/150136
PCT Pub. Date: Sep. 29, 2016

(65) Prior Publication Data
US 2018/0077162 A1    Mar. 15, 2018

(30) Foreign Application Priority Data

Mar. 26, 2015    (CN) .......................... 201510136881.4

(51) Int. Cl.
*H04L 29/06* (2006.01)
*G06F 21/51* (2013.01)
(Continued)

(52) U.S. Cl.
CPC .......... *H04L 63/101* (2013.01); *G06F 16/958* (2019.01); *G06F 21/44* (2013.01); *G06F 21/51* (2013.01); *H04L 63/20* (2013.01)

(58) Field of Classification Search
CPC ....... H04L 63/10; H04L 63/20; H04L 63/101; G06F 21/51; G06F 21/44; G06F 16/958
See application file for complete search history.

(56) References Cited

U.S. PATENT DOCUMENTS 8,370,464 B1 *   2/2013   Chitilian ........... H04L 29/08072
                                                   709/220
2004/0205187 A1 * 10/2004  Sayal ...................... H04L 67/02
                                                   709/224
(Continued)

FOREIGN PATENT DOCUMENTS

CN    102377793 A    3/2012
CN    102521101 A    6/2012
(Continued)

OTHER PUBLICATIONS

Almohri H.M.J. et al., "Process Authentication for High System Assurance", IEEE Transactions on Dependable and Secure Computing 11(2):168-180 (Mar./Apr. 2014).
(Continued)

*Primary Examiner* — Taghi T Arani
*Assistant Examiner* — Lin Chang
(74) *Attorney, Agent, or Firm* — Cantor Colburn LLP

(57) ABSTRACT

The present disclosure relates to a method and system for updating a webpage and a webpage server. The method includes: upon detection of an update instruction, acquiring a feature value of an update process that generates the update instruction, the feature value comprising a process name and process identification of the update process; comparing the acquired feature value with each set of feature values in a preset process whitelist; and if there is an item in the preset process whitelist which is identical to the acquired feature value, adjusting a stored webpage document according to the update instruction.

13 Claims, 2 Drawing Sheets

- S10: Upon detection of an update instruction, acquire a feature value of an update process that generates the update instruction
- S20: Compare the acquired feature value with each set of feature values in a preset process whitelist
- S30: If there is an item in the preset process whitelist which is identical to the acquired feature value, adjust a stored webpage file according to the update instruction

(51) Int. Cl.
*G06F 21/44* (2013.01)
*G06F 16/958* (2019.01)

(56) References Cited

U.S. PATENT DOCUMENTS

| | | | |
|---|---|---|---|
| 2006/0168221 A1* | 7/2006 | Juhls | H04L 67/02 709/225 |
| 2006/0288420 A1* | 12/2006 | Mantripragada | G06F 21/51 726/25 |
| 2009/0276860 A1 | 11/2009 | Miyabashi | |
| 2012/0221768 A1* | 8/2012 | Bagal | G06F 12/084 711/103 |
| 2013/0097708 A1* | 4/2013 | Jayanthi | G06F 21/554 726/25 |
| 2014/0020083 A1* | 1/2014 | Fetik | G06F 21/552 726/11 |
| 2014/0215006 A1* | 7/2014 | Gupta | H04L 67/1095 709/217 |
| 2015/0082424 A1 | 3/2015 | Shukla | |
| 2015/0128211 A1* | 5/2015 | Kirner | H04L 63/104 726/1 |
| 2015/0193618 A1* | 7/2015 | Takano | G06F 21/554 726/23 |
| 2017/0329969 A1* | 11/2017 | Murata | G06F 9/445 |
| 2018/0048470 A1* | 2/2018 | Bower, III | G06F 21/72 |

FOREIGN PATENT DOCUMENTS

| | | | | |
|---|---|---|---|---|
| CN | 102547400 A | | 7/2012 | |
| CN | 102810101 A | | 12/2012 | |
| CN | 103685308 A | | 3/2014 | |
| CN | 104348914 | * | 2/2015 | H04L 67/06 |
| CN | 104348914 A | | 2/2015 | |

OTHER PUBLICATIONS

Extended European Supplementary Search Report dated Mar. 21, 2018 received in European Patent Application No. 15 88 6058.5.
International Search Report dated Dec. 25, 2015 issued in PCT/CN2015/090962.

* cited by examiner

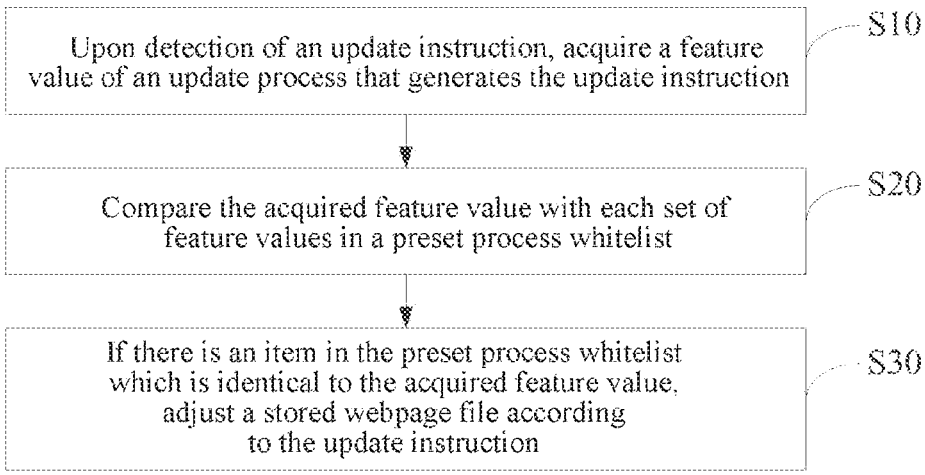
Fig. 1
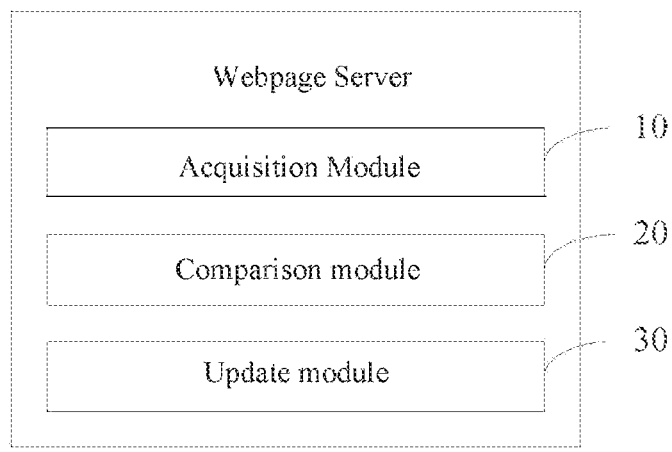
Fig. 2
Fig. 3

WEBPAGE UPDATING METHOD AND SYSTEM AND WEBPAGE SERVER

CROSS-REFERENCE TO RELATED APPLICATION

This application is based upon and claims priority to PCT Application No. PCT/CN2015/090962, filed Sep. 28, 2015, which is based upon and claims priority to Chinese Patent Application No. 201510136881.4, filed Mar. 26, 2015, the entire contents of which are incorporated herein by reference.

TECHNICAL FIELD

The present disclosure relates to the technical field of internet, and more particularly, to a method for updating a webpage, a system for updating a webpage and a webpage server.

BACKGROUND

It is well known that website service is provided through a webpage server, and a user may browse a corresponding webpage provided by a webpage server by entering a website address through a user terminal, so as to browse information. A service provider periodically updates webpage documents in the webpage server to update information of the website, such that a user may browse real-time information. However, since the webpage server is deployed on a public network, contents of the website may be illegally changed by hackers, to allow access to pornography and even illegal contents which the service provider are not intended to present to the users, resulting in a rather low security for the webpage server in the related art.

This section provides background information related to the present disclosure which is not necessarily prior art.

SUMMARY

Embodiments of the present disclosure provide a method and a system for updating a webpage and a webpage server, in order to improve the security of the webpage server.

An embodiment of the present disclosure provides a method for updating a webpage. The method for updating a webpage includes the following steps.

Upon detection of an update instruction, a feature value of an update process that generates the update instruction is acquired. The feature value includes a process name and process identification of the update process.

The acquired feature value is compared with each set of feature values in a preset process whitelist.

If there is an item in the preset process whitelist which is identical to the acquired feature value, a stored webpage document is adjusted according to the update instruction.

Prior to the step of upon detection of an update instruction, acquiring a feature value of an update process that generates the update instruction, the method for updating a webpage may further include:

upon receipt of a security policy sent by a policy server, generating the preset process whitelist according to the security policy and a feature value of a preset process.

After the step of matching the acquired feature value with each set of feature values in a preset process whitelist, the method for updating a webpage may further include:

if the acquired feature value does not match any set of the feature values in the preset process whitelist, terminating the update process.

Prior to the step of upon detection of an update instruction, acquiring a feature value of an update process that generates the update instruction, the method for updating a webpage may further include:

upon receipt of an updating request input by a user, invoking a corresponding update process according to the updating request to generate the update instruction.

Further, an embodiment of the present disclosure also provides a webpage server. The webpage server includes a processor and a memory.

The memory stores instructions executable by the processor.

The processor is configured to:

upon detection of an update instruction, acquire a feature value of an update process that generates the update instruction; the feature value including a process name and process identification of the update process;

compare the acquired feature value with each set of feature values in a preset process whitelist;

if there is an item in the preset process whitelist which is identical to the acquired feature value, adjust a stored webpage document according to the update instruction.

Further, an embodiment of the present disclosure also provides a system for updating a webpage. The system for updating a webpage includes a webpage server and a policy server. The policy server is configured to send a security policy to the webpage server.

The webpage server comprises a primary webpage server and secondary webpage servers, and the primary webpage server is configured to upon receipt of an updating request entered by the user, distribute the updating request to the secondary webpage servers, for the secondary webpage servers to respond to the updating request.

In the embodiments of the present disclosure, upon detection of an update instruction, a feature value of an update process that generates the update instruction is acquired, and the feature value includes a process name and a process ID of the update process. The acquired feature value is compared with each set of feature values in a preset process whitelist. If there is an item in the preset process whitelist which is identical to the acquired feature value, a stored webpage document is adjusted according to the update instruction. As compared with the related art in which whether a process initiating a modification operation is legal is determined only based on the process name, in the present disclosure, the determination is based on both of the process name and the process ID. It can avoid illegal change of the content of the webpage server by an illegal (or unauthorized) user, and thus the present disclosure can improve security of the webpage server.

This section provides a summary of various implementations or examples of the technology described in the disclosure, and is not a comprehensive disclosure of the full scope or all features of the disclosed technology.

BRIEF DESCRIPTION OF THE DRAWINGS

FIG. 1 is a flow chart illustrating a method for updating a webpage according to a preferred embodiment of the present disclosure;

FIG. 2 is a diagram illustrating an example of a preset process whitelist in a method for updating a webpage according to an exemplary embodiment of the present disclosure;

FIG. 3 is a block diagram illustrating functional modules in a webpage server according to an exemplary embodiment of the present disclosure.

Figure 4:
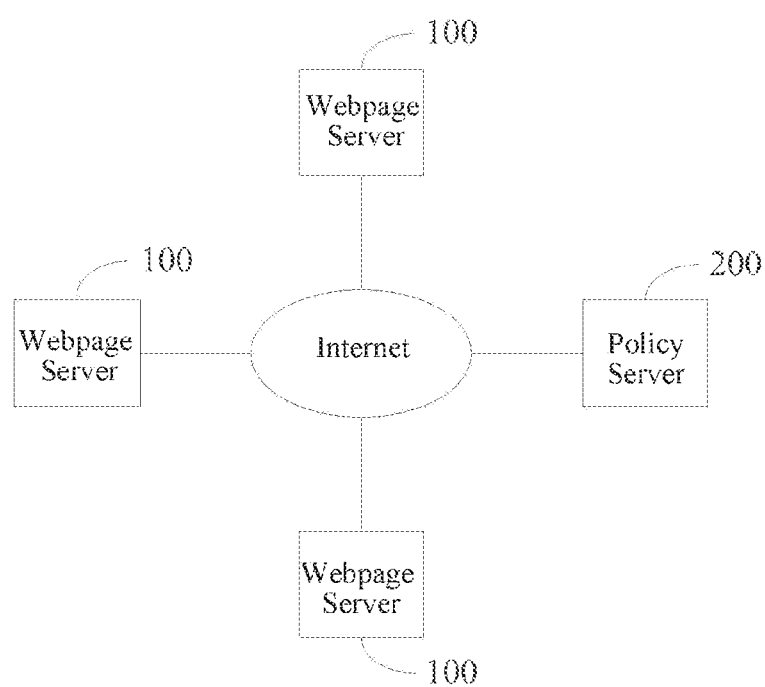
FIG. 4 is a schematic diagram of a system for updating a webpage applied to a webpage server as shown in FIG. 3, according to an embodiment of the present disclosure.

The objects, functional features and advantages of the present disclosure will be further described with reference to the accompanying drawings.

DETAILED DESCRIPTION

It should be understood that the specific embodiments described herein are merely illustrative of the present disclosure and are not intended to limit the present disclosure.

An embodiment of the present disclosure provides a method for updating a webpage. Referring FIG. 1, in an exemplary embodiment of the method for updating a webpage according to the present disclosure, the method for updating a webpage includes the following steps.

In step S10, upon detection of an update instruction, a feature value of an update process that generates the update instruction is acquired. The feature value includes a process name and process identification (ID) of the update process.

It is well known that that website service is provided through a webpage server, and a user may browse a corresponding webpage provided by a webpage server by entering a website address through a user terminal, so as to browse information. At present, in order to prevent a webpage from being illegally changed by illegal users, a process whitelist may be deployed on the webpage server, and the process whitelist may include legal update processes specified by the service provider, such that only the update processes in the whitelist are allowed to perform an updating operation on the webpage server, so as to prevent illegal users from invoking illegal update processes to tamper with (or illegally change) the webpage. However, the existing technology is unable to prevent tampering behavior of some high level hackers. For example, after a hacker hacked into the webpage server and obtain the process whitelist deployed on the webpage server, the hacker may write a program and assign it with a process name of an update process in the process whitelist. Then, after the program is executed, the webpage server will treat the program as a legitimate (or authorized) update process, and the illegal change initiated by such process cannot be identified and prevented with the existing technology.

In view of the above, in the present embodiment, when the webpage server detects an update instruction, the webpage server firstly acquires a feature value of an update process that generates the update instruction. The feature value includes a process name and a process ID of the update process. It should be noted that, although the process name may be specified, the corresponding process ID thereof is unique. Any process run on the base of the webpage server, and after a process is started, the webpage server assigns a unique process ID (Process ID, PID) to identify its uniqueness.

In step S20, the acquired feature value is compared with each set of feature values in a preset process whitelist.

In the present embodiment, after the webpage server acquires the feature value of the update process that generates the update instruction, the webpage server continues to compare the acquired feature value with each set of feature values in the preset process whitelist, to determine whether the update process is a legal update process specified by the service provider. For example, FIG. 2 is a diagram illustrating an example of a preset process whitelist.

In step S30, if there is an item in the preset process whitelist which is identical to the acquired feature value, a stored webpage document is adjusted according to the update instruction.

It should be noted that only when the process names are identical and the process IDs are identical, it is considered that the feature values are identical.

In the present embodiment, if a matching item identical to the acquired feature value exists in the preset process whitelist, it indicates that the update process corresponding to the feature value is a legal update process specified by the service provider, and thus the update instruction generated by the update process may be responded. Then, the webpage server adjusts the stored webpage document according to the update instruction. Adjusting the stored webpage document may include modifying, deleting and adding the webpage document to present real-time and effective information before users.

For example, an update process that generates an update instruction has a process name of update and a process ID of 737. After the feature value of the update process is acquired, the acquired feature value is compared with each set of feature values in the preset process whitelist. Referring to FIG. 2, it may be seen that the update process is a legal update process specified by the service provider. Then, the stored webpage document is adjusted according to the update instruction.

In the method for updating a webpage proposed in the embodiment of the present disclosure, upon detection of an update instruction, a feature value of an update process that generates the update instruction is acquired, and the feature value includes a process name and a process ID of the update process. The acquired feature value is compared with each set of feature values in a preset process whitelist. If there is an item in the preset process whitelist which is identical to the acquired feature value, a stored webpage document is adjusted according to the update instruction. As compared with the related art in which whether a process initiating a modification operation is legal is determined only based on the process name, in the present disclosure, the determination is based on both of the process name and the process ID. The present disclosure can avoid illegal change of the content of the webpage server by an illegal (or an unauthorized) user, and thus the present disclosure may improve security of the webpage server.

Further, in an exemplary embodiment of the method for updating a webpage according to the present disclosure, prior to the above step S10, the method for updating a webpage may also include the following step.

Upon receipt of a security policy sent by a policy server, the preset process whitelist is generated according to the security policy and a feature value of a preset process.

Generally, web service is provided by a plurality of cooperated webpage servers deployed on a public network, which are probably distributed over multiple places. It should be readily understood that apparently it is unrealistic that users separately set up security policy for each webpage server. Therefore, the security policy may be distributed by the policy server such that each webpage server maintains uniform security policy. Users may configure the security policy through a specific interface provided by the policy server. For example, when a user needs to specify an update process as a legal update process, the user may enter the process name of the corresponding update process through the specific interface. Then, the policy server may generate a security policy according to the process name of the update process specified by the user and send the generated security policy to each webpage server.

In the present embodiment, when the webpage server receives a security policy sent by the policy server, the webpage server may generate the preset process whitelist according to the security policy and a feature value of a preset process (an update process that is allowed to generate an update instruction to initiate a modification operation on the stored webpage document). The security policy includes a process name entered by the user based on the policy server. The feature value of each preset process may be acquired by the webpage server at the time when the update process is started, and may be stored in an encrypted form in a local process database of the webpage server. Specifically, since locally in the webpage server, there may be a plurality of update processes that are allowed to initiate a modification operation on the stored webpage document, when in the process database, there is a feature value corresponding to an update process which is not included in the security policy, the webpage server filters out the feature value corresponding to the update process which is not included in the security policy, to generate the preset process whitelist.

It should be noted that, although the process ID of any process remains unchanged during its operation, the webpage server will assign a new process ID after the process restarts. For example, an update process restarts as the webpage server restarts. Therefore, after each time the webpage server restarts or an update process restarts, the preset process whitelist is re-generated, to maintain the normal execution of its security policy.

Further, in an exemplary embodiment of the method for updating a webpage according to the present disclosure, after the above step S20, the method for updating a webpage may also include the following step.

If the acquired feature value does not match any set of the feature values in the preset process whitelist, the update process is terminated.

It should be understood that if the acquired feature value does not match any set of the feature values in the preset process whitelist, it indicates that the update process corresponding to the feature value is not a legal update process specified by the service provider. At this time, the webpage server may probably be hacked into by a hacker.

In the present embodiment, if the acquired feature value does not match any set of the feature values in the preset process whitelist, the webpage server may terminate the update process, in order to prevent the webpage server from being damaged, thereby further improving the security of the webpage server.

Further, in an exemplary embodiment of the method for updating a webpage according to the present disclosure, prior to the above step S10, the method for updating a webpage may also include the following step.

Upon receipt of an updating request entered by a user, a corresponding update process is invoked according to the updating request, to generate an update instruction.

In the present embodiment, the webpage server receiving the updating request may invoke a local corresponding update process according to the updating request and cause the update process to generate an update instruction based on the updating request, to initiate a modification operation.

It should be understood by those skilled in the art that the user may enter an updating request directly through a particular interface provided by the webpage server, or may remotely send the updating request via the user terminal over the internet.

An embodiment of the present disclosure provides a webpage server. Referring FIG. 3, in an exemplary embodiment of the webpage server according to the present disclosure, the webpage server includes an acquisition module 10, a comparison module 20 and an update module 30.

The acquisition module 10 is configured to, upon detection of an update instruction, acquire a feature value of an update process that generates the update instruction. The feature value includes a process name and a process ID of the update process.

It is well known that that website service is provided through a webpage server, and a user may browse a corresponding webpage provided by a webpage server by entering a website address through a user terminal, so as to browse information. At present, in order to prevent a webpage from being illegally changed by illegal users, a process whitelist may be deployed on the webpage server, and the process whitelist may include legal update processes specified by the service provider, such that only the update processes in the whitelist are allowed to perform an updating operation on the webpage server, so as to prevent illegal users from invoking illegal update processes to illegally change the webpage. However, the existing technology is unable to prevent tampering behavior of some high level hackers. For example, after a hacker hacked into the webpage server and obtain the process whitelist deployed on the webpage server, the hacker may write a program and assign it with a process name of an update process in the process whitelist. Then, after the program is executed, the webpage server will treat the program as a legitimate update process, and the illegal change initiated by such process cannot be identified and prevented with the existing technology.

In view of the above, in the present embodiment, when the acquisition module 10 detects an update instruction, the acquisition module 10 firstly acquires a feature value of an update process that generates the update instruction. The feature value includes a process name and a process ID of the update process. It should be noted that, although the process name may be specified, the corresponding process ID thereof is unique. Any process run on the base of the webpage server, and after a process is started, the webpage server assigns a unique process ID (Process ID, PID) to identify its uniqueness.

The comparison module 20 is configured to compare the acquired feature value with each set of feature values in a preset process whitelist.

In the present embodiment, after the acquisition module 10 acquires the feature value of the update process that generates the update instruction, the comparison module 20 continues to compare the acquired feature value with each set of feature values in the preset process whitelist, to determine whether the update process is a legal update process specified by the service provider. For example, FIG. 2 is a diagram illustrating an example of a preset process whitelist.

The update module 30 is configured to, if there is an item in the preset process whitelist which is identical to the acquired feature value, adjust a stored webpage document according to the update instruction.

It should be noted that only when the process names are identical and the process IDs are identical, it is considered that the feature values are identical.

In the present embodiment, if there is an item in the preset process whitelist which is identical to the acquired feature value, it indicates that the update process corresponding to the feature value is a legal update process specified by the service provider, and thus the update instruction generated by the update process may be responded. Then, the update module 30 may adjust the stored webpage document according to the update instruction. Adjusting the stored webpage document may include modifying, deleting and adding the webpage document to present real-time and effective information before users.

For example, an update process that generates an update instruction has a process name of update and a process ID of 737. After the acquisition module 10 acquires the feature value of the update process, the comparison module 20 matches the feature value acquired by the acquisition module 10 with each set of feature values in the preset process whitelist. Referring to FIG. 2, it may be seen that the update process is a legal update process specified by the service provider. Then, the update module 30 adjusts the stored webpage document according to the update instruction.

In the webpage server proposed in the embodiment of the present disclosure, upon detection of an update instruction, a feature value of an update process that generates the update instruction is acquired, and the feature value including a process name and a process ID of the update process. The acquired feature value is compared with each set of feature values in a preset process whitelist. If there is an item in the preset process whitelist which is identical to the acquired feature value, a stored webpage document is adjusted according to the update instruction. As compared with the related art in which whether a process initiating a modification operation is legal is determined only based on the process name, in the present disclosure, the determination is based on both of the process name and the process ID. It may avoid illegal change of the content of the webpage server by an illegal user, and thus the present disclosure may improve security of the webpage server.

Further, in an exemplary embodiment of the webpage server according to the present disclosure, the webpage server may also include a generation module configured to, upon receipt of a security policy sent by a policy server, generate the preset process whitelist according to the security policy and a feature value of a preset process.

Generally, web service is provided by a plurality of cooperated webpage servers deployed on a public network, which are probably distributed over multiple places. It should be readily understood that apparently it is unrealistic that users separately set up security policy for each webpage server. Therefore, the security policy may be distributed by the policy server such that each webpage server maintains uniform security policy. Users may configure the security policy through a specific interface provided by the policy server. For example, when a user needs to specify an update process as a legal update process, the user may enter the process name of the corresponding update process through the specific interface. Then, the policy server may generate a security policy according to the process name of the update process specified by the user and send the generated security policy to each webpage server.

In the present embodiment, when the generation module receives a security policy sent by the policy server, the generation module may generate the preset process whitelist according to the security policy and a feature value of a preset process (an update process that is allowed to generate an update instruction to initiate a modification operation on the stored webpage document). The security policy includes a process name input by the user based on the policy server. The feature value of each preset process may be acquired by a process registration module of the webpage server at the time when the update process is started, and may be stored in an encrypted form in a local process database of the webpage server. Specifically, since locally in the webpage server, there may be a plurality of update processes that are allowed to initiate a modification operation on the stored webpage document, when in the process database, there is a feature value corresponding to an update process which is not included in the security policy, the generation module may filter out the feature value corresponding to the update process which is not included in the security policy, to generate the preset process whitelist.

It should be noted that, although the process ID of any process remains unchanged during its operation, the webpage server will assign a new process ID after the process restarts. For example, an update process restarts as the webpage server restarts. Therefore, after each time the webpage server restarts or an update process restarts, the generation module re-generates the preset process whitelist, to maintain the normal execution of its security policy.

Further, in an exemplary embodiment of the webpage server according to the present disclosure, the webpage server may also include a termination module configured to, if the acquired feature value does not match any set of the feature values in the preset process whitelist, terminate the update process.

It should be understood that if the acquired feature value does not match any set of the feature values in the preset process whitelist, it indicates that the update process corresponding to the feature value is not a legal update process specified by the service provider. At this time, the webpage server may probably be hacked into by a hacker.

In the present embodiment, if the acquired feature value does not match any set of the feature values in the preset process whitelist, the termination module may terminate the update process, in order to prevent the webpage server from being damaged, thereby further improving the security of the webpage server.

Further, in an exemplary embodiment of the webpage server according to the present disclosure, the webpage server may also include an invoking module configured to, upon receipt of an updating request entered by a user, invoke a corresponding update process according to the updating request, to generate an update instruction.

In the present embodiment, the invoking module receiving the updating request may invoke a local corresponding update process according to the updating request and cause the update process to generate an update instruction based on the updating request, to initiate a modification operation.

It should be understood by those skilled in the art that the user may enter an updating request directly through a particular interface provided by the webpage server, or may remotely send the updating request via the user terminal over the internet.

An embodiment of the present disclosure also provides a system for updating a webpage. Referring to FIG. 4, in an embodiment of the system for updating a webpage according to the present disclosure, the system for updating a webpage includes a webpage server 100 and a policy server 200. The policy server 200 is configured to send a security policy to the webpage server 100. The configuration of the webpage server 100 may be found in the descriptions about the above embodiments, which will not be repeated herein. It should be understood that, since the system for updating a webpage in the present embodiment employs the technical solution of the above webpage server 100, the system for updating a webpage may have all the beneficial effects of the webpage server 100.

Further, based on the embodiment, there is provided a further embodiment of the system for updating a webpage according to the present disclosure. In the embodiment, the webpage server 100 includes a primary webpage server and secondary webpage servers. The primary webpage server is configured to upon receipt of an updating request entered by the user, distribute the updating request to the secondary webpage servers, for the secondary webpage servers to respond to the updating request.

Generally, web service is provided by a plurality of cooperated webpage servers 100 deployed on a public network, which are probably distributed over multiple places. Therefore, one primary webpage server is required to distribute the content of the webpage to be updated, to ensure the uniformity of the contents of the webpage servers.

In the present embodiment, when the primary webpage server receives an updating request, the primary webpage server distributes the updating request to each secondary webpage servers, so that the secondary webpage servers respond to the updating request. The updating request may include the above content of the webpage.

The foregoing is merely exemplary embodiments of the present disclosure and is not intended to limit the scope of the present disclosure. Similarly, any equivalent configuration or equivalent process based on the description and the accompanying drawings of the present disclosure, or directly or indirectly applied in other related art, all fall within the scope of the patent protection of the present disclosure.

INDUSTRIAL APPLICABILITY

As described above, according to the embodiments of the present disclosure, there are provided a method for updating a webpage, a system for updating a webpage, and a webpage server which have the following advantages. As compared with the related art in which whether a process initiating a modification operation is legal is determined only based on the process name, in the embodiments of the present disclosure, the determination is based on both of the process name and the process ID. It may avoid illegal change of the content of the webpage server by an illegal user, and thus the present disclosure may improve security of the webpage server.

What is claimed is:

1. A method for updating a webpage, applied by a webpage server, comprising:
   upon detection of an update instruction in the webpage server, acquiring by the webpage server, a feature value of an update process that generates the update instruction in the webpage server, the feature value comprising a process name and process identification of the update process, wherein, the update process is used to update webpage of the webpage server;
   comparing by the webpage server the acquired feature value with each set of feature values in a preset update process whitelist generated by the webpage server; and
   if there is an item in the preset update process whitelist generated by the webpage server, which is identical to the acquired feature value of the webpage server, adjusting by the webpage server, a stored webpage document according to the update instruction;
   wherein prior to, upon the detection of the update instruction, acquiring the feature value of the update process that generates the update instruction, the method further comprises:
   upon the webpage server's receipt of a security policy sent by a policy server, generating by the webpage server, the preset update process whitelist according to the security policy and a feature value of a preset update process;
   wherein prior to the step of, upon the detection of the update instruction, acquiring the feature value of the update process that generates the update instruction, the method further comprises:
   upon receipt of an updating request input by a user, invoking the corresponding update process according to the updating request to generate the update instruction, wherein invoking the corresponding update process according to the updating request to generate the update instruction comprises: invoking by the webpage server, a local corresponding update process according to the updating request and causing by the webpage server, the update process to generate the update instruction based on the updating request, to initiate a modification operation.

2. The method for updating a webpage according to claim 1, wherein after the step of comparing the acquired feature value with each set of feature values in a preset update process whitelist, the method further comprises:
   if the feature value of the update process acquired by the webpage server does not match any set of the feature values in the preset update process whitelist, terminating the update process.

3. A webpage server, comprising:
   a processor; and
   a memory for storing instructions executable by the processor;
   wherein the processor of the webpage server is configured to:
   upon detection of an update instruction in the webpage server, acquire a feature value of an update process that generates the update instruction in the webpage server, the feature value comprising a process name and process identification of the update process, wherein, the update process is used to update webpage of the webpage server;
   compare the acquired feature value with each set of feature values in a preset update process whitelist; and
   if there is an item in the preset update process whitelist which is identical to the acquired feature value, adjust a stored webpage document according to the update instruction;
   wherein the processor of the webpage server is further configured to:
   prior to the acquiring the feature value of the update process that generates the update instruction, upon receipt of a security policy sent by a policy server, generate the preset update process whitelist according to the security policy and a feature value of a preset update process;
   the processor of the webpage server is further configured to:
   upon receipt of an updating request input by a user, invoke a corresponding update process according to the updating request, to generate the update instruction, wherein invoking the corresponding update process according to the updating request to generate the update instruction comprises: invoking by the webpage server, a local corresponding update process according to the updating request and causing by the webpage server, the update process to generate the update instruction based on the updating request, to initiate a modification operation.

4. The webpage server according to claim 3, wherein the processor is further configured to:
if the feature value of the update process acquired by the webpage server does not match any set of the feature values in the preset update process whitelist, terminate the update process.

5. A system for updating a webpage, comprising: one or more webpage servers and a policy server, wherein:
the policy server is configured to send a security policy to the webpage server; and
each of the webpage servers comprises:
a processor; and
a memory for storing instructions executable by the processor;
wherein the processor is configured to:
upon detection of an update instruction in the webpage server, acquire a feature value of an update process that generates the update instruction in the webpage server, the feature value comprising a process name and process identification of the update process, wherein, the update process is used to update webpage of the webpage server;
compare the acquired feature value with each set of feature values in a preset update process whitelist; and
if there is an item in the preset update process whitelist which is identical to the acquired feature value, adjust a stored webpage document according to the update instruction;
wherein the processor is further configured to:
prior to the acquiring the feature value of the update process that generates the update instruction, upon receipt of a security policy sent by a policy server, generate the preset update process whitelist according to the security policy and a feature value of a preset update process;
wherein the processor is further configured to:
upon receipt of an updating request input by a user, invoke a corresponding update process according to the updating request, to generate the update instruction, wherein invoking the corresponding update process according to the updating request to generate the update instruction comprises: invoking by the webpage server, a local corresponding update process according to the updating request and causing by the webpage server, the update process to generate the update instruction based on the updating request, to initiate a modification operation.

6. The system for updating a webpage according to claim 5, wherein the webpage servers comprise a primary webpage server and secondary webpage servers, and the primary webpage server is configured to upon receipt of an updating request input by a user, distribute the updating request to the secondary webpage servers, so that the secondary webpage servers respond to the updating request.

7. The method for updating a webpage according to claim 1, wherein the process whitelist comprises legitimate update processes specified by a server provider.

8. The method for updating a webpage according to claim 1, wherein the process identification is unique and assigned by the webpage server.

9. The method for updating a webpage according to claim 1, wherein adjusting by the webpage server, the stored webpage document according to the update instruction comprises:
modifying, deleting, and adding the webpage document to present real-time and effective information to users.

10. The method for updating a webpage according to claim 1, wherein the feature value of each preset update process is acquired by the webpage server at the time when the update process is started, and is stored in an encrypted form in a local process database of the webpage server.

11. The method for updating a webpage according to claim 1, wherein the preset update process whitelist is re-generated after each time the webpage server restarts.

12. The method for updating a webpage according to claim 1, wherein the preset update process whitelist is re-generated after each time the update process restarts.

13. The method for updating a webpage according to claim 1, wherein the process identification of any process remains unchanged during its operation, and the webpage server will assign a new process identification after the process restarts.

* * * * *